United States Patent
Fratti et al.

(10) Patent No.: US 7,963,046 B2
(45) Date of Patent: Jun. 21, 2011

(54) AUTO-CALCULATED LENGTH DETERMINATION AND DISPLAY

(75) Inventors: Roger A. Fratti, Mohnton, PA (US); John A. Michejda, Berkeley Heights, NJ (US)

(73) Assignee: LSI Corporation, Milpitas, CA (US)

( * ) Notice: Subject to any disclaimer, the term of this patent is extended or adjusted under 35 U.S.C. 154(b) by 16 days.

(21) Appl. No.: 12/491,407

(22) Filed: Jun. 25, 2009

(65) Prior Publication Data

US 2010/0325909 A1    Dec. 30, 2010

(51) Int. Cl.
*G01B 3/10* (2006.01)
*G06G 1/00* (2006.01)

(52) U.S. Cl. .......... 33/759; 33/755; 33/763; 33/494

(58) Field of Classification Search .......... 33/762, 33/755, 759, 761, 763, 494, 679.1
See application file for complete search history.

(56) References Cited

U.S. PATENT DOCUMENTS

| | | | | |
|---|---|---|---|---|
| 2,824,374 | A * | 2/1958 | Abrams et al. | 33/763 |
| 4,185,390 | A * | 1/1980 | Tateishi | 33/762 |
| 4,195,348 | A * | 3/1980 | Kakutani | 702/164 |
| 4,242,574 | A * | 12/1980 | Grant | 377/18 |
| 4,747,215 | A * | 5/1988 | Waikas | 33/763 |
| 4,839,833 | A * | 6/1989 | Parhiskari | 702/161 |
| 4,890,392 | A * | 1/1990 | Komura et al. | 33/762 |
| 5,027,526 | A * | 7/1991 | Crane | 33/763 |
| 5,050,312 | A * | 9/1991 | McCannon | 33/700 |
| 5,251,382 | A * | 10/1993 | Hellar | 33/759 |
| 5,386,643 | A * | 2/1995 | Corcoran | 33/762 |
| 5,433,014 | A * | 7/1995 | Falk et al. | 33/763 |
| 5,647,135 | A * | 7/1997 | Fuentes et al. | 33/494 |
| 5,983,514 | A * | 11/1999 | Lindsey | 33/760 |
| 6,205,671 | B1 * | 3/2001 | Langmaid | 33/663 |
| RE37,212 | E * | 6/2001 | Marshall | 33/759 |
| 6,658,755 | B2 * | 12/2003 | Arlinsky | 33/760 |
| 7,343,694 | B2 * | 3/2008 | Erdfarb | 33/759 |
| 7,631,439 | B2 * | 12/2009 | Black | 33/759 |
| 2005/0166417 | A1 * | 8/2005 | Clapper | 33/759 |

* cited by examiner

*Primary Examiner* — Christopher W Fulton
(74) *Attorney, Agent, or Firm* — Mendelsohn, Drucker & Associates, P.C.; Edward J. Meisarosh; Steve Mendelsohn

(57) ABSTRACT

In one embodiment, a tape measure having a tape, housing, and an input, has an OLED strip overlaid on top of the tape. The housing contains a programmable controller and a rolled-up portion of the tape. A specified fraction of the length of the linear target is provided to the controller using the input. The tape may be extracted from the housing to generate an exposed portion of the tape corresponding to the total length of a linear target. The controller receives information indicative of the total length of the linear target. The controller controls the OLED strip to show, i.e., light up along the tape, a fractional portion corresponding to the specified fraction of the linear target.

24 Claims, 2 Drawing Sheets

100

200

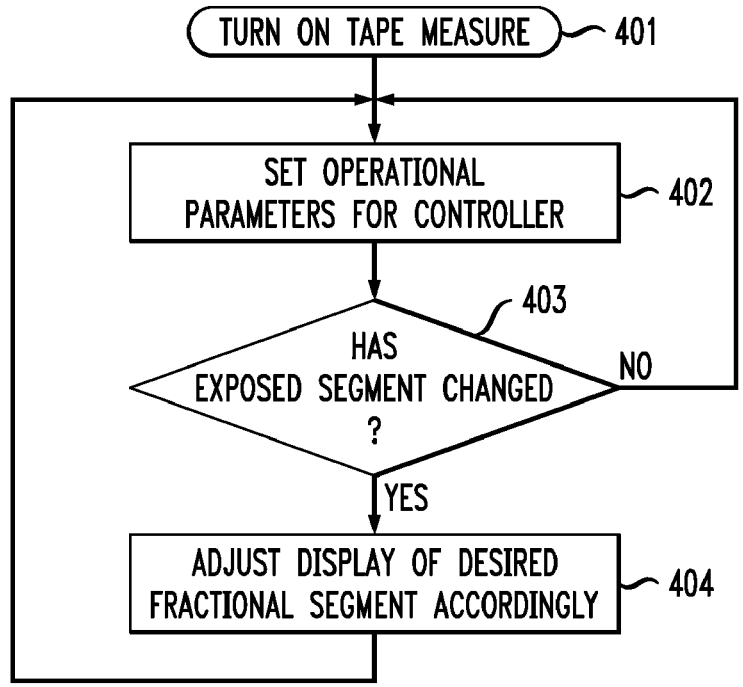
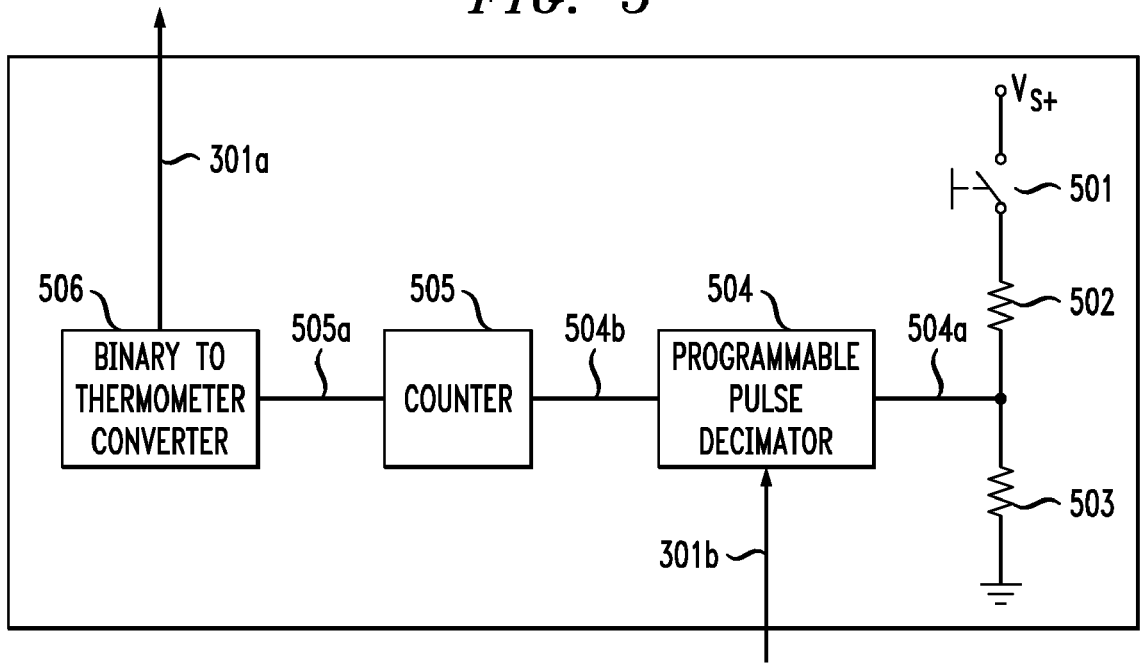

100 US 7,963,046 B2

AUTO-CALCULATED LENGTH DETERMINATION AND DISPLAY

BACKGROUND OF THE INVENTION

1. Field of the Invention

The current invention relates to measuring devices, and in particular, to devices that measure linear lengths, such as tape measures.

2. Description of the Related Art

Tape measures and rulers are devices that are used for measuring linear lengths of a variety of items. While a ruler is generally a marked, rigid, flattened stick-like object of fixed dimensions, a tape measure is flexible and can be extended to an almost infinite variety of lengths, up to a maximum length. A folding ruler, which comprises a plurality of sub-rulers movably connected together falls somewhere in between a ruler and a tape measure. Tape measures and folding rulers are, in essence, adjustable-length measuring devices. A tape measure typically includes a ribbon, i.e., "tape," made of a flexible material, such as, e.g., metallic ribbon or fiber, where the tape is marked to indicate linear lengths. The tape measure may consist of just the tape, which can be rolled-up, folded, or otherwise compacted. Typically, however, the tape measure includes a housing which stores, rolled-up, the unused portion of the tape.

FIG. 1 shows a simplified perspective view of exemplary prior-art tape measure 100. Tape measure 100 comprises housing 101 and tape 102. Only the extracted portion of tape 102 is visible in FIG. 1, while the rest of tape 102 is rolled up inside housing 101. Tape 102 comprises zero mark 103 at a first edge of tape 102. Zero mark 103 is at length zero. Tape 102 is marked and labeled to indicate increasing linear lengths from zero mark 103. Typically, for American tape measures, the markings indicate lengths in inches and fractions thereof.

Zero mark 103 is accompanied by tab 104, which is orthogonal to tape 102 and which facilitates measuring from the edge of a solid object. Generally, tape measures may be used to measure any linear target, where a linear target is defined by two distinct points in space. Often, these two distinct points are opposing edges of a rectangular solid. To measure the length of such a linear target, tape 102 is pulled out of housing 101 to the extent needed to equal or exceed the length of the target, presuming tape 102 is at least as long as the target. Zero mark 103 is set substantially at the first point of the target, and the length marking on tape 102 is read at substantially the second point of the linear target, thereby providing the length of the linear target. This mode of measurement is referred to herein as regular mode.

In some situations, the linear target is a space between a first point and a second point, where the target can be measured by having zero mark 103 at the first point and far edge 105 of housing 101 at the second point, presuming tape 102 is long enough to have tape measure 100 span the distance. The distance between the two points is then determined by adding the width w of housing 101 to the measurement on tape 102 at near edge 106 of housing 101. This mode of measurement, which uses an offset w, is referred to herein as offset mode.

If a user of tape measure 100 wants to find a particular fractional length of a target length, then the user would measure the length of the target, then calculate the desired fraction of the length, and then would be able to mark that fractional length along the target. This system for determining fractional lengths of target lengths is cumbersome and may also be subject to errors from calculation errors and incorrect readings of measurements.

SUMMARY OF THE INVENTION

One embodiment of the invention can be an apparatus comprising (1) a measuring device for measuring a target length, (2) a visual display incorporated with the measuring device, the visual display adapted to indicate a specified function of the target length, and (3) a controller adapted to receive information indicating the target length and control the visual display to indicate a measurable length that is substantially equal to the specified function of the target length.

Another embodiment of the invention can be a method comprising (1) measuring a target length with a measuring device, (2) specifying a function, and (3) controlling a visual display to visually indicate a measurable length that is substantially equal to the specified function of the target length.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 4 shows a flowchart illustrating exemplary operation of the tape measure of FIG. 2 using components illustrated in FIG. 3.

FIG. 5 shows a simplified block diagram of an exemplary implementation of the controller of FIG. 3 in accordance with one embodiment of the present invention.

DETAILED DESCRIPTION

In accordance with one embodiment of the invention, a tape measure automatically displays a fractional portion along the extracted portion of a tape. The tape comprises an adjustable linear display connected to a controller. A user provides to the tape measure a specified fraction and proceeds to extract a portion of the tape corresponding to a total length, where the total length can equal the length of the extracted portion of the tape or be offset from the extracted-portion length by a determined length. The tape measure then displays, along the extracted tape itself, as a measurable length, the fractional portion, which corresponds to the specified fraction of the total length. For example, if the total length is 30 inches and the specified fraction is one-third, then the tape displays a measurable 10-inch-long fractional portion. This way, the user does not have to read the total length, calculate the fraction of the total, and manually locate the fractional length. The described system and method is both more convenient and less prone to error than the prior-art systems and methods.

Figure 1:
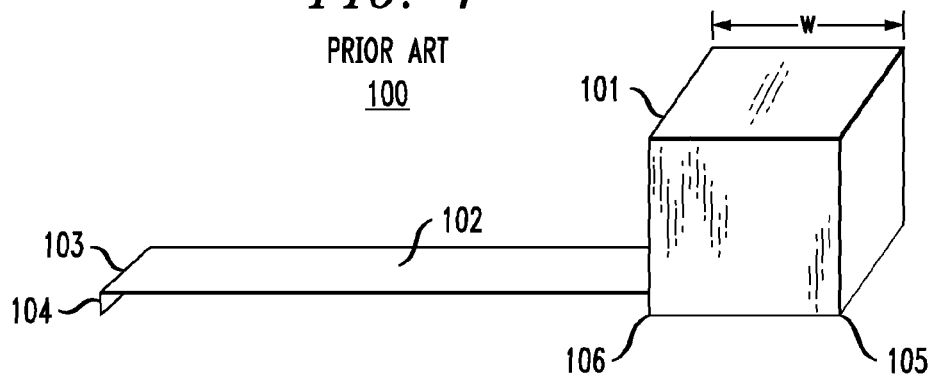
FIG. 1 shows a simplified perspective view of an exemplary prior-art tape measure.
Figure 2:
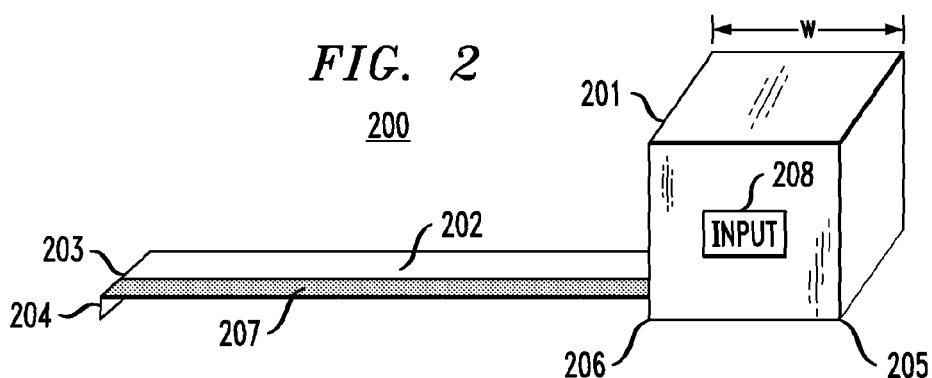
FIG. 2 shows a simplified perspective view of an exemplary tape measure in accordance with one embodiment of the present invention.

FIG. 2 shows a simplified perspective view of tape measure 200 in accordance with one embodiment of the present invention. Elements of FIG. 2 that correspond to elements of FIG. 1 have been similarly labeled, but with a different prefix. Tape measure 200 comprises OLED (organic light-emitting diode) strip 207 that is overlaid on top of (or embedded within), and parallel to, tape 202. OLED strip 207 is an electronically controllable display means. OLED strip 207 comprises a plurality of individual OLEDs, each of which may be turned on or off by a controller (not shown in FIG. 2) located in housing 201. The plurality of individual OLEDs in OLED strip 207 may be ordered in one or more rows and columns. OLEDs are used in tape measure 200 because OLEDs are capable of functioning on surfaces that flex, whereas certain other types of LEDs require rigid surfaces. OLED strip 207 is used to visually display fractional portions along tape 202, as explained in more detail below.

Housing 201 comprises input module 208, which allows a user to provide input to the controller. User input can include (a) turning on or off tape measure 200, i.e., its electric components, (b) selecting regular, offset, or other measurement mode, (c) selecting a specified fraction of the total length to mark, and/or (d) selecting a particular method for displaying the fractional portion. Possible display methods include: (a) showing the fractional portion as (1) solidly lit or (2) flashing in some pattern, (b) showing the remainder portion (i.e., the segment of the exposed portion of tape 202 that is not the fractional portion) as (1) solidly lit or (2) flashing in some pattern, or (c) showing the edge of the fractional portion, as measured from either zero mark 203 or near edge 206, as a point, line, diamond, arrowhead, box, or other shape that is (1) solidly lit or (2) flashing in some pattern. Note that showing the edge of the fractional portion also shows the edge of the remainder portion.

It should be noted that input module 208 may be any suitable type of input system. Input module 208 may, for example, comprise one or more electro-mechanical switches where pressing, pulling, turning, or sliding buttons or dials indicates particular inputs. Input module 208 may include a feedback display showing to the user the inputs provided. Input module 208 may include an informational display for numerically showing information such as measured or calculated distances. Input module 208 may comprise a connection port (not shown) for connecting to a separate input device (not shown), which allows a user to enter instructions on the separate input device, whereupon corresponding instructions are provided to tape measure 200 via the connection port of input module 208. The connection port may be for wired and/or wireless communication. For example, the connection port may comprise a Bluetooth® transceiver that allows tape measure 200 to be controlled by a Bluetooth®-capable device.

Housing 201 includes a source of electric power (not shown), such as a battery. In one implementation, housing 201 includes a mechanism that generates electrical power from the mechanical energy of pulling out tape 202. Tape measure 200 may be used like a prior-art tape measure if the power source is unavailable for any reason (e.g., if the battery is exhausted or if tape measure 200 is turned off). After tape measure 200 is turned on, the user selects a measurement mode, a specified fraction, and a display method. In one embodiment, these settings default to their previously set settings, if any, so that the user does not have to re-enter the user's preferences every time the user turns on tape measure 200. In one implementation, tape measure 200 comprises a nonvolatile memory (not shown) that stores the previously set settings. In another implementation, where the settings are set using mechanical switches, the settings remain as previously set so long as the mechanical switches remain in their respective previously set positions.

The user extracts tape 202 to an extent corresponding to the linear target. Note that the exposed length of tape 202 may vary depending on the measurement mode. In regular mode, tape 202 would be pulled out so that zero mark 203 and near edge 206 correspond to the ends of the linear target. In offset mode, tape 202 would be pulled out so that zero mark 203 and far edge 205 correspond to the ends of the linear target. OLED strip 207 then shows the fractional portion. In one embodiment, the shown fractional length is continually adjusted as tape 202 is extracted and also as tape 202 is retracted into housing 201. Thus, if, for example, the specified fraction is one half in regular-mode measurement, then, as tape 202 gets pulled out of housing 201, half of the exposed portion of tape 202 is continuously indicated.

Housing 201 comprises means for determining the length of tape 202 that is exposed. As would be appreciated by one of ordinary skill in the art, numerous such means are available. In one implementation, an optical sensor (not shown) reads and counts markings (not shown) on tape 202 as it is extracted and retracted to determine the exposed length of tape 202. In another implementation, a rotary switch (not shown in FIG. 2) is connected to a wheel (not shown) in contact with tape 202 such that when tape 202 is extracted and/or retracted, the wheel turns and the connected rotary switch converts the wheel's rotational motion into electrical pulses indicative of the length of tape 202 extracted and/or retracted.

In yet another implementation, tape 202 includes indicators of a location's distance from zero mark 203 so that, as tape 202 is extracted or retracted, a sensor in housing 201 detects a proximate location indicator to determine the exposed length of tape 202. For example, the location indicators may be bar codes encoding the bar code's distance from zero mark 203. In one implementation, two or more length-determining means are used in combination.

In another implementation, where tape 202 is wrapped around a cylinder (not shown) inside housing 201, the rotary switch is instead attached to the cylinder and converts the cylinder's rotational motion into electrical pulses. As would be appreciated by one of ordinary skill in the art, the relationship between the angular rotation of the cylinder and the extracted length of tape is not constant since the circumference of the outer layer of tape decreases as the tape is extracted. In some implementations, where the variation may be considered negligible, the variation is ignored. In other implementations, a controller (not shown in FIG. 2) uses a correction factor to adjust its output to account for the variation. Other corrective measures may also be utilized.

Figure 3:
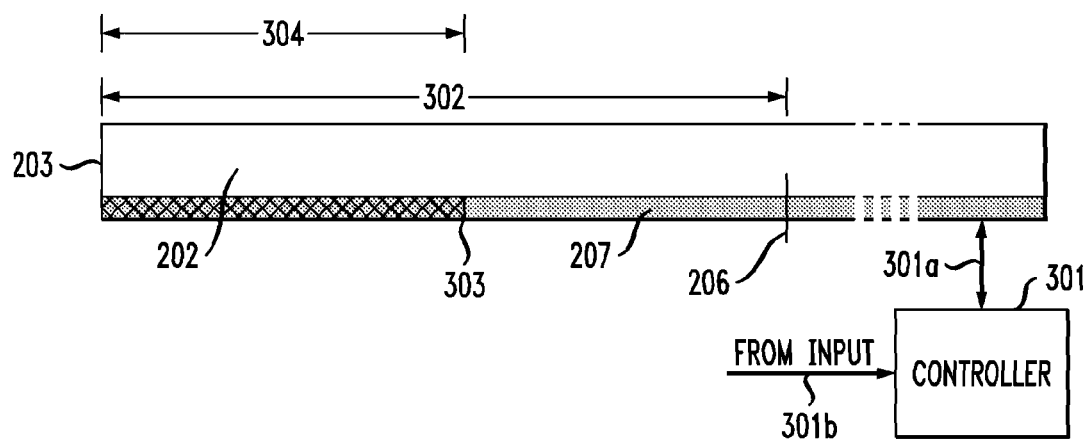
FIG. 3 shows a simplified diagram of select components of the tape measure of FIG. 2.

FIG. 3 shows a simplified diagram of some components of tape measure 200 of FIG. 2 in order to illustrate an exemplary use of tape measure 200. FIG. 3 shows a top view of unrolled tape 202, which is electrically connected to controller 301 via path 301a. Controller 301 (1) controls the OLEDs in OLED strip 207 and (2) receives, via path 301b, input information from input module 208. Tape 202 is shown shortened, as indicated by the dashed lines. Exposed portion 302 of tape 202 is the portion between zero mark 203 and near edge 206. Fractional-portion edge 303 represents the edge of fractional portion 304.

FIG. 4 shows flowchart 400 illustrating exemplary operation of tape measure 200 of FIG. 2 using the components illustrated in FIG. 3. Operation starts with the turning on of tape measure 200 (step 401). Operational parameters for controller 301 are then set (step 402). Setting the parameters is typically keeping the previous settings of controller 301, unless some new input has been received via path 301b. Controller 301 determines whether exposed portion 302 has changed in length (step 403). If it is determined that there has been no change in exposed portion 302, then the process returns to step 402 to set the operational parameters for controller 301. If it is determined that there has been a change in exposed portion 302, then controller 301 adjusts the display of fractional portion 304 (step 404), and then the process returns to step 402. Fractional portion 304, where the specified fraction is one half in regular measuring mode, is illustrated in FIG. 3 by the crosshatched section of OLED strip 207 between zero mark 203 and fractional-portion edge 303. The process is terminated (not shown) when tape measure 200 is turned off.

FIG. 5. shows a simplified block diagram of an exemplary implementation of controller 301 of FIG. 3 in accordance with one embodiment of the present invention. This implementation of controller 301 is for an embodiment of tape measure 200 where (a) tape measure 200 is reset before each use, (b) tape measure 200 operates in regular measuring mode, and (c) OLED strip 207 shows the fractional portion as solidly lit. Controller 301 comprises electro-mechanical rotary switch 501, which is mechanically connected to a wheel (not shown) in contact with tape 202, such that as tape 202 is pulled out, switch 202 is periodically opened and closed, or "clicked," where each click of switch 501 substantially corresponds to the pulling out of a particular length of tape 202. Switch 501 is connected between supply voltage $V_{S+}$ and resistor 502, which, in turn is connected to resistor 503. Resistors 502 and 503 are also connected, via path 504a, to programmable pulse decimator 504. Resistor 503 is connected between resistor 502 and a reference voltage (e.g., ground). Each clicking of switch 501 causes a pulse to be provided to pulse decimator 504 via path 504a.

Pulse decimator 504 is programmed, via input 301b, to output via output 504b a programmed proportion of the pulses received via input 504a. For example, if the specified fraction is one third, then the user inputs that specified fraction, which is used to program pulse decimator 504 via path 301b. For example, the value "3," which is the inverse of one third, can be used to program pulse decimator 504 to output one third of the received pulses. Pulse decimator 504 will then output one pulse via output 504b for every three pulses received via input 504a. Counter 505 counts the number of pulses received from pulse decimator 504 via path 504b and outputs the result via path 505a to binary-to-thermometer ("BTT") converter 506.

Thermometer code is a way to encode values in base one, where as values increase, the number of consecutive ones increases correspondingly. For example, the first five numbers using thermometer code would be 00001, 00011, 00111, 01111, and 11111. BTT converter 506 converts the output of counter 505 into thermometer code for output to OLED strip 207 via path 301a. Each digit of the output of BTT converter 506 corresponds to a segment of OLED strip 207 that is lit up when that digit is one. Thus, as tape 202 is pulled out, an increasing and proportional number of segments of OLED strip 207 get lit up, displaying one third of the exposed portion of tape 202.

In another implementation, where rotary switch 501 is instead mechanically connected to a cylinder (not shown) around which tape 202 is wound, controller 301 makes adjustments to account for the varying circumference of rolled-up tape 202 by having pulse decimator 504 adjust its output accordingly. For example, pulse decimator 504 outputs a smaller proportion of pulses as more of tape 202 is extracted and the corresponding circumference shrinks.

As would be appreciated by one of ordinary skill in the art, various adjustments may be made to controller 301 in order to have tape measure 200 operate in different modes, display results differently, and/or determine the exposed portion of tape 202 differently.

In some embodiments of tape measure 200 of FIG. 2, tape measure 200 performs length-related calculations involving two or more related measurements and displays the linear result using OLED strip 207. The desired operation may be indicated by using input module 208. For example, a user may wish to determine the appropriate length for a third rod to connect the unconnected ends of two orthogonally connected rods—i.e., determine the hypotenuse for two given sides of a right triangle. The user indicates the desired operation, measures the length of the first rod, indicates the completion of the first step, measures the length of the second rod, and indicates the completion of the second step. Thereupon, controller 301, using the Pythagorean theorem ($a^2+b^2=c^2$), determines the appropriate length for the third rod, and displays that length using OLED strip 207. Instead of determining an appropriate length for a third rod, a user may wish to use the indicated hypotenuse length to accurately connect two unconnected rods at a ninety-degree angle.

As another example, a user may wish to display the difference between two lengths. The user indicates the desired operation, measures the first length, indicates the completion of the first step, measures the second length, and indicates the completion of the second step. Thereupon, controller 301 determines the difference between the two measured lengths and indicates that difference using OLED strip 207.

As yet another example, a user may wish to determine the minimum of a plurality of lengths. The user indicates the desired operation and measures each of the plurality of length, indicating the completion of each measurement. The first measurement becomes the first stored minimum. For each successive measurement, controller 301 replaces the stored minimum with the new measurement if controller 301 determines that the new length is shorter than the stored minimum. After measuring the last of the plurality of lengths, the user indicates completion of measurements. Thereupon, controller 301 displays the stored minimum length using OLED strip 207. Similarly, tape measure 200 may be used to determine and display the maximum and/or the average of the plurality of lengths.

An embodiment of tape measure 200 of FIG. 2 has been described where input module 208 allows a user to provide various kinds of instructions to tape measure 200. In alternative embodiments of the tape measure, input module 208 allows for the input of only limited instructions to tape measure 200.

In one alternative embodiment of tape measure 200 of FIG. 2, input module 208 is unused or omitted. In this embodiment, tape measure 200 is preset to measure in either regular or offset mode and display a particular fraction of the measured length. The electrical components of this embodiment of tape measure 200 are powered on when needed. The electrical components may, for example, be automatically turned on when tape 202 gets pulled out of housing 201.

In another alternative embodiment of tape measure 200 of FIG. 2, tape measure 200 operates only in one of regular mode or offset mode of measurement, and input module 208 is used to select the specified fraction of the measured length. In yet another alternative embodiment of tape measure 200, tape measure 200 has a predetermined specified fraction, and input module 208 is used to select regular mode or offset mode of measurement.

Tab 204 of tape 202 of FIG. 2 has a non-zero width in the dimension parallel to width w of housing 201. Embodiments of the invention have been described where the width of tab 204 is negligible and is ignored in determining the fractional portion to display. In some embodiments, tape measure 200 adjusts the displayed fractional portion to account for the width of tab 204. The particular adjustment may depend on whether zero mark 203 aligns with the inner edge of tab 204 (i.e., the edge closer to housing 201), the outer edge of tab 204, or somewhere in between. The particular adjustment may also depend on whether tape measure 200 is being used for regular-mode or offset-mode measurement. For example, if zero mark 203 is aligned with the inner edge of tab 204 and an offset-mode measurement is made, then the width of tab 204 is added to the width w of housing 201 in determining the total length of the linear target.

Embodiments of the invention have been described that utilize an OLED strip affixed to a tape to indicate determined lengths. The invention is not limited to such OLED strips. In alternative embodiments, suitable visible indication means other than OLED strips are used to indicate determined lengths. For example, in some alternative embodiments, LCDs (liquid crystal displays) are used to indicate determined lengths.

Embodiments of the invention have been described wherein the two points of a linear target are marked by an edge of tape at one point and an edge of a housing at another end. The invention is not limited to such marking. In one alternative embodiment, one of the two points of the linear target is manually marked by a user by, for example, pressing on the tape at the appropriate location, where the pressure is detected by a sensor in the tape. For example, tape 202 of FIG. 3 may be used to measure linear target (not shown) shorter than exposed portion 302, where zero mark 203 is at a first point of the linear target, and the user presses on tape 202 at a location corresponding to the second point of the linear target to indicate the length of the linear target. Fractional portion 304 is then determined based on the marked endpoint of the linear target. In another alternative embodiment, both points of the linear target are manually marked by the user.

Embodiments of the invention have been described where a tape measure is used to measure lengths. The invention is not limited to tape measures. In some alternative embodiments, measuring means other than a tape measure are used. For example, in some embodiments folding rulers or other collapsible rulers are used. In some embodiments, where at least one point of a linear target is manually marked by a user, a rigid non-collapsible ruler is used.

Embodiments of the invention have been described where a tape measure is used to measure linear lengths. It should be noted that the invention is not limited to measuring straight Euclidean lines. As used herein, the term "linear" represents all lines, where a line is a continuous extent of length, straight or curved, without breadth or thickness, equivalent to the trace of a moving point. Thus, for example, longitudes and latitudes around a globe or roads on a map are linear.

In one alternative embodiment of tape 202 of FIG. 3, tape 202 is a string that is flexible in multiple dimensions (rather than a ribbon, which is generally flexible in limited dimensions) and OLED strip 207 is incorporated into the string. Thus, for example tape 202 may be used to measure irregular linear targets such as routes on a map and OLED strip 207 would display fractional portions of the linear targets. It should be noted that the term "adjustable-length measuring devices," as used herein, may include ribbons, strings, foldable rulers, and rigid rulers.

References herein to the verb "to set" and its variations in reference to values of fields do not necessarily require an active step and may include leaving a field value unchanged if its previous value is the desired value. Setting a value may nevertheless include performing an active step even if the previous or default value is the desired value.

Unless indicated otherwise, the term "determine" and its variants as used herein refer to obtaining a value through measurement and, if necessary, transformation. For example, to determine an electrical-current value, one may measure a voltage across a current-sense resistor, and then multiply the measured voltage by an appropriate value to obtain the electrical-current value. If the voltage passes through a voltage divider or other voltage-modifying components, then appropriate transformations can be made to the measured voltage to account for the voltage modifications of such components and to obtain the corresponding electrical-current value.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

The term "nonvolatile memory," as used herein, refers to any type of memory that substantially retains its stored contents after disconnection from its power supply, i.e., the stored contents can be retrieved after reconnecting the nonvolatile memory to a power supply. Examples of nonvolatile memory include, but are not necessarily limited to (i) fuse/antifuse devices such as OTP memory and PROM, (ii) charge-storing devices such as EPROM and EEPROM and flash ROM, (iii) magnetic media devices such as hard drives and tapes, and (iv) optical, opto-electrical, and opto-magnetic media such as CDs and DVDs.

Exemplary embodiments have been described wherein particular entities (a.k.a. modules) perform particular functions. However, the particular functions may be performed by any suitable entity and are not restricted to being performed by the particular entities named in the exemplary embodiments.

References herein to the verb "to generate" and its variants in reference to information or data do not necessarily require the creation and/or storage of new instances of that information. The generation of information could be accomplished by identifying an accessible location of that information. The generation of information could also be accomplished by having an algorithm for obtaining that information from accessible other information.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. An apparatus comprising:
    a measuring device for measuring a target length;
    a visual display incorporated with the measuring device, the visual display adapted to indicate a selectable specified function of the target length; and
    a controller adapted to
        automatically receive information indicating the target length; and
        control the visual display to indicate a measurable length that is substantially equal to the specified function of the target length.

2. The apparatus of claim 1, wherein the visual display comprises an organic light-emitting diode (OLED) strip comprising a plurality of organic light-emitting diodes (OLEDs).

3. The apparatus of claim 2, wherein the controller lights up a portion of the OLED strip substantially equal in length to the measurable length.

4. The apparatus of claim 3, wherein the portion is lit up in a flashing pattern.

5. The apparatus of claim 1, wherein:
    the measuring device comprises a zero mark;
    a fractional portion having a first end and a second end is substantially equal in length to the specified function of the target length;
    the first end of the fractional portion is at the zero mark; and
    the visual display indicates the fractional portion by indicating the second end of the fractional portion.

6. The apparatus of claim 1, further comprising an input adapted to receive information from a user and provide the user information to the controller.

7. The apparatus of claim 6, wherein the specified function is a selectable specified fraction of the target length.

8. The apparatus of claim 6, wherein the input comprises a connection port for connecting the apparatus to a separate input device.

9. The apparatus of claim 6, further comprising a non-volatile memory adapted to store the user information and provide the stored user information to the controller.

10. The apparatus of claim 1, wherein:
    the apparatus further comprises a housing having a width in a dimension substantially parallel to the measuring device, the housing adapted to allow at least a portion of the measuring device to be extracted from and retracted into the housing;
    the information indicating the target length is substantially the length of the measuring device extracted from the housing; and
    the apparatus is adapted to measure the target length in any one of regular mode and offset mode, wherein:
        in offset mode, the controller adds the width of the housing to the received information to determine the target length; and
        in regular mode, the controller does not add the width of the housing to the received information to determine the target length.

11. The apparatus of claim 10, further comprising an input adapted to receive information from a user and provide the user information to the controller, wherein the user information comprises a selection of one of regular mode and offset mode.

12. The apparatus of claim 1, further comprising a housing, wherein:
    the housing comprises a rotatable cylinder;
    the measuring device is a tape adapted to be rolled around the rotating cylinder and extracted from the housing; and
    the visual display comprises an organic light-emitting diode (OLED) strip overlaid on top of and in parallel to the tape.

13. The apparatus of claim 12, further comprising a mechanism that generates electrical power from mechanical energy generated by extracting the tape from the housing.

14. The apparatus of claim 12, further comprising a rotary switch connected to a wheel, wherein:
    the wheel is adapted to contact the tape such that when the tape is extracted, the wheel turns and the rotary switch provides the information indicating the target length to the controller.

15. The apparatus of claim 1, wherein:
    the apparatus further comprises a housing and an optical sensor;
    the measuring device is a tape adapted to be extracted from the housing;
    the tape comprises markings readable by the optical sensor; and
    the optical sensor is adapted to:
        read the markings on the tape as the tape is extracted from the housing; and
        provide the information indicating the target length to the controller.

16. The apparatus of claim 1, wherein the controller is adapted to:
    receive information indicating the target length and one or more other target lengths; and
    control the visual display to indicate the measurable length as substantially equal to the specified function of the target length and the one or more other target lengths.

17. The apparatus of claim 1, wherein:
    the controller receives information indicating a first and a second length; and
    the controller controls the visual display to indicate the measurable length as substantially equal to a hypotenuse of a right triangle having a first leg of the first length and a second leg of the second length.

18. The apparatus of claim 1, wherein the measuring device comprises a plurality of pressure-detecting sensors adapted to provide to the controller information indicating the target length in response to being appropriately pressed, wherein:
the target length has a first end point and a second end point; and
a first pressed pressure-detecting sensor indicates and is located at the first end point of the target length.

19. The apparatus of claim 1, wherein the measuring device is an adjustable-length measuring device.

20. A method comprising:
measuring a target length with a measuring device;
automatically receiving information indicating the target length;
selecting a specified function; and
controlling a visual display to visually indicate a measurable length that is substantially equal to the specified function of the target length.

21. An apparatus comprising:
a measuring device for measuring a target length;
a visual display incorporated with the measuring device, the visual display adapted to indicate a specified function of the target length; and
a controller adapted to
receive information indicating the target length; and
control the visual display to indicate a measurable length that is substantially equal to the specified function of the target length; and
a housing, wherein:
the housing comprises a rotatable cylinder;
the measuring device is a tape adapted to be rolled around the rotating cylinder and extracted from the housing; and
the visual display comprises an organic light-emitting diode (OLED) strip overlaid on top of and in parallel to the tape.

22. The apparatus of claim 21, further comprising a mechanism that generates electrical power from mechanical energy generated by extracting the tape from the housing.

23. The apparatus of claim 21, further comprising a rotary switch connected to a wheel, wherein:
the wheel is adapted to contact the tape such that when the tape is extracted, the wheel turns and the rotary switch provides the information indicating the target length to the controller.

24. An apparatus comprising:
a measuring device for measuring a target length;
a visual display incorporated with the measuring device, the visual display adapted to indicate a selectable specified function of the target length; and
a controller adapted to
receive information indicating the target length; and
control the visual display to indicate a measurable length that is substantially equal to the specified function of the target length, wherein:
the measuring device comprises a plurality of pressure-detecting sensors adapted to provide to the controller information indicating the target length in response to being appropriately pressed;
the target length has a first end point and a second end point; and
a first pressed pressure-detecting sensor indicates and is located at the first end point of the target length.

* * * * *